United States Patent
Slack et al.

(10) Patent No.: US 9,625,704 B1
(45) Date of Patent: Apr. 18, 2017

(54) LIQUID DISPENSING METHOD FOR MANUFACTURING AN ELECTROWETTING DEVICE

(71) Applicant: Amazon Technologies, Inc., Seattle, WA (US)

(72) Inventors: Anthony John Slack, Lorgues (FR); Romaric Mathieu Massard, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 293 days.

(21) Appl. No.: 14/577,692

(22) Filed: Dec. 19, 2014

(51) Int. Cl.
| *G02B 1/00* | (2006.01) |
| *G02B 26/00* | (2006.01) |
| *B05D 1/36* | (2006.01) |
| *B05D 3/02* | (2006.01) |
| *B05D 3/12* | (2006.01) |

(52) U.S. Cl.
CPC ............ *G02B 26/005* (2013.01); *B05D 1/36* (2013.01); *B05D 3/0254* (2013.01); *B05D 3/12* (2013.01)

(58) Field of Classification Search
CPC ....... B05D 1/36; G02B 26/004; G02B 26/005
See application file for complete search history.

(56) References Cited

U.S. PATENT DOCUMENTS

| 3,928,194 A | * | 12/1975 | Tao ........................ C10G 33/00 516/146 |
| 2010/0033801 A1 | * | 2/2010 | Baesjou ................. G02F 1/167 359/296 |
| 2013/0057940 A1 | * | 3/2013 | Jo ........................ G02B 26/005 359/290 |
| 2014/0226200 A1 | | 8/2014 | Nomura |

FOREIGN PATENT DOCUMENTS

| WO | 2011135044 A1 | 11/2011 |
| WO | 2011157826 A1 | 12/2011 |
| WO | 2012126851 A1 | 9/2012 |

OTHER PUBLICATIONS

Hiroyuki Kamiya, et al., "56.3: Development of One Drop Fill Technology for AM-LCDs", SID 01 Digest, pp. 1354-1357, 2001, (ISSN/0001-096X/01/3201-1354).

* cited by examiner

*Primary Examiner* — Scott W Dodds
(74) *Attorney, Agent, or Firm* — EIP US LLP

(57) ABSTRACT

A method of manufacturing an electrowetting device includes dispensing a first liquid on a surface of a support plate and dispensing a second liquid to adjoin the first liquid. The first liquid is an emulsion. A first portion of the first liquid transfers into the second liquid to form a first layer of liquid and a second layer of liquid substantially immiscible with the first layer. The first layer comprises a second portion of the first liquid and the second layer comprises the second liquid and the first portion.

18 Claims, 4 Drawing Sheets

LIQUID DISPENSING METHOD FOR MANUFACTURING AN ELECTROWETTING DEVICE

BACKGROUND

In a known electrowetting device, a first layer of liquid and a second layer of liquid immiscible with the first layer are confined between a first support plate and a second support plate. A known method of manufacturing such an electrowetting device involves providing at least one of the layers of liquid in solid form, for example as a solid gel. Then, stimulation is applied to change the solid to a liquid. In such a method, the transition from solid to liquid can be problematic, for example due to volume changes during the transition. This can make accurate dispensing of a liquid for the manufactured device difficult. Further, as a result of the manufacturing process, liquids in the manufactured device include contaminants from the solid, for example gelling agents, which can hinder performance of the device and compromise design freedom when selecting the composition of liquids for the device.

It is desirable to provide an improved method of manufacture of an electrowetting device.

DETAILED DESCRIPTION

Figure 1:
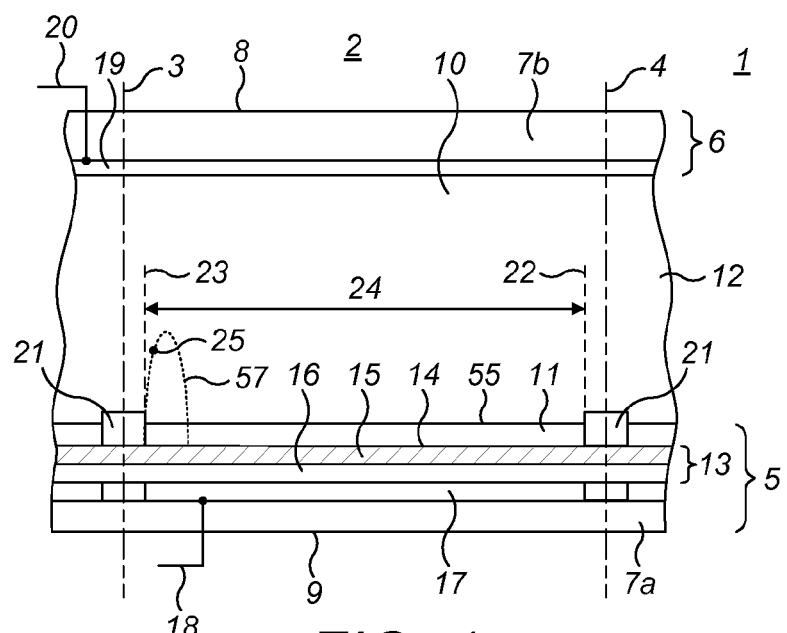
FIG. 1 shows schematically an example electrowetting display element.

FIG. 1 shows a diagrammatic cross-section of part of an example of an electrowetting display device 1, including a plurality of picture elements or display elements 2, one of which is shown in the Figure and which may also be referred to as an electrowetting pixel. Such a pixel or display element is an example of an electrowetting cell or an electrowetting element, the pixel or display element being an example of an electrowetting element for providing a display effect. The lateral extent of the display element is indicated in the Figure by two dashed lines 3, 4. The display elements comprise a first support plate 5 and a second support plate 6. The support plates may be separate parts of each display element, but the support plates may be shared in common by the plurality of display elements. The support plates may include a glass or polymer substrate 7a, 7b and may be rigid or flexible. The support plates in some examples include further layers and/or structures than illustrated, for example circuitry for controlling the display elements. Such features are not illustrated, for clarity.

The display device has a viewing side 8 on which an image or display formed by the display device can be viewed and a rear side 9. In the Figure a surface of the first support plate 5, which surface is in this example a surface of the substrate 7a, defines the rear side 9; a surface of the second support plate 6, which surface is in this example a surface of the substrate 7b, defines the viewing side 8; alternatively, in other examples, a surface of the first support plate may define the viewing side. The display device may be of the reflective, transmissive or transflective type. The display device may be an active matrix driven or a direct drive display device. The plurality of display elements may be monochrome. For a colour display device the display elements may be divided in groups, each group having a different colour; alternatively, an individual display element may be able to show different colours.

A space 10, which may otherwise be considered to be a chamber, of each display element between the support plates is filled with two liquids. In the example of FIG. 1, the space 10 is filled with a first layer of liquid 11 and a second layer of liquid 12. The liquid of the second layer is substantially immiscible with the liquid of the first layer. Therefore, the first layer and the second layer do not substantially mix with each other and in some examples do not mix with each other to any degree. With the first and second layers substantially not mixing with each other, it is envisaged in some examples that there may be some degree of mixing of the first and second layers, but that this is considered negligible in that the majority of the volume of first layer is not mixed with the majority of the volume of the second layer. The substantial immiscibility of the first and second layers is due to the properties of the first and second layers, for example their chemical compositions; the first and second layers tend to remain separated from each other, therefore tending not to mix together to form a homogeneous mixture. Due to this immiscibility, the liquids of the first and second layers meet each other at an interface labelled 55 in FIG. 1 for when no voltage is applied and labelled 57 for when a voltage is applied, which interface defines a boundary between the volume of the liquid of the first layer and the volume of the liquid of the second layer; this interface or boundary may be referred to as a meniscus. The location and shape of the interface between the first layer and the second layer in examples is determined by the applied voltage. The thickness of the first and second layers in FIG. 1 is shown as an example; in other examples, the first and/or second layers may have different thicknesses.

The liquid of the second layer of the device is at least one of electrically conductive or polar, i.e. the liquid of the second layer is electrically conductive, polar, or both, and may be water, or a salt solution such as a solution of potassium chloride in water. The liquid of the second layer may be transparent; it may instead be coloured, for example, or absorbing. The liquid of the first layer of the device, which is electrically non-conductive, may for example include an alkane like decane or hexadecane, silicone oil or decalin (otherwise known as bicyclo-4,4,0-decane).

The liquid of the first layer may absorb at least a part of the visible spectrum. The liquid of the first layer may be transmissive for a part of the visible spectrum, forming a colour filter. For this purpose the liquid of the first layer may be coloured by addition of pigment particles or a dye. Alternatively, the liquid of the first layer may be black, i.e. absorb substantially all parts of the visible spectrum, or reflecting. A reflective liquid may reflect the entire visible spectrum, making the layer appear white, or part of it, making it have a colour. In examples described herein, the liquid of the first layer is black and therefore absorbs substantially all parts of the optical spectrum, for example in the visible light spectrum. The term "substantially absorbs" includes a degree of variation, therefore the liquid of the first layer may not absorb all wavelengths, but the majority of wavelengths within a given spectrum such as the visible spectrum, so as to perform the function of the first layer in the element. The liquid of the first layer may therefore be configured to absorb substantially all light incident on the first layer. For example the liquid of the first layer may absorb 90% or more of light in the visible spectrum and incident on the first layer.

The support plate 5 includes a layer with a surface for adjoinment by a liquid such as the liquid of the first layer described herein. In examples described herein, the layer is an insulating layer 13. The insulating layer may be transparent, for example fully transparent, i.e. transmissive. The insulating layer 13 may extend between walls of a display element. To avoid short circuits between the second layer of liquid 12 and electrodes arranged under the insulating layer, layers of the insulating layer may extend uninterrupted over a plurality of display elements 2, as shown in the Figure. The insulating layer has a surface 14 facing, i.e. closest to, the space 10 of the display element 2. The thickness of the insulating layer may be less than 2 micrometers and may be less than 1 micrometer.

The insulating layer in examples described herein is for example formed of a layer 15 which is for example formed of a hydrophobic material such as Teflon AF1600® and a barrier layer 16 with predetermined dielectric properties, the layer 15 facing, i.e. being closer to, the space 10, as shown in the Figure. The barrier layer 16 may have a thickness, taken in a direction perpendicular to the plane of the substrate, between 50 nanometers and 500 nanometers and may be made of an inorganic material like silicon oxide or silicon nitride.

In the absence of an applied voltage, i.e. with the applied voltage being a zero voltage, the liquid of the first layer 11 adheres preferentially to the surface of the insulating layer 13 for adjoinment by the first layer, since the surface for adjoinment by the first layer has a higher, i.e. greater, wettability for the liquid of the first layer than for the liquid of the second layer; the surface may therefore be hydrophobic. As will be explained, with the applied voltage being a non-zero voltage, the surface has a higher wettability for the liquid of the second layer than for the liquid of the first layer; i.e. the surface with the applied non-zero voltage may be considered to be hydrophilic. Wettability relates to the relative affinity of a liquid for the surface of a solid. Wettability may be measured by the contact angle between a boundary of the liquid and the surface of the solid. The contact angle is determined by the difference in surface tension between the liquid and the solid at the liquid-solid boundary. For example, a high difference in surface tension can indicate hydrophobic properties. As the skilled person will appreciate, a material may be considered to be hydrophobic if the contact angle with water is greater than 90 degrees; a material may therefore be considered to be hydrophilic if the contact angle with water is less than 90 degrees.

Each display element 2 includes a first electrode 17 as part of the support plate 5. In examples shown there is one such electrode 17 per element; in other examples there may be more than one electrode per display element. The electrode 17 is electrically insulated from the first and second layers by the insulating layer 13; electrodes of neighbouring display elements are separated by a nonconducting layer. In some examples, further layers may be arranged between the insulating layer 13 and the electrode 17. The electrode 17 can be of any desired shape or form. The electrode 17 of a display element is supplied with voltage signals by a signal line 18, schematically indicated in the Figure.

The support plate 6 for example includes a second electrode 19, which may extend between walls of a display element, or be located above or covering the walls of the display element or extend uninterruptedly over a plurality of display elements 2, as shown in the Figure. The electrode 19 is in electrical contact with the liquid of the second layer 12 and is common to all display elements. The electrodes 17 and 19 may be made of for example the transparent conductive material indium tin oxide (ITO). A second signal line 20 is connected to the electrode 19. Alternatively, the electrode may be arranged at a border of the support plates, where it is in electrical contact with the liquid of the second layer. This electrode may be common to all elements, when they are liquidly interconnected by and share the liquid of the second layer, uninterrupted by walls. The display element 2 can be controlled by a voltage V applied between the signal lines 18 and 20. The signal line 18 can be coupled to a matrix of control lines on the substrate 7a. The signal line 18 and 20 are coupled to a display driving system.

The liquid of the first layer 11 in this example is confined to a display element by at least one wall, in this example walls 21, that follow the cross-section of the display element. The cross-section of a display element may have any shape; when the display elements are arranged in a matrix form, the cross-section is usually square or rectangular. Although the walls are shown as structures protruding from the insulating layer 13 and formed on a surface of the insulating layer 13, they may instead be a surface layer of the support plate that repels the liquid of the first layer, such as a hydrophilic or less hydrophobic layer. The walls may extend from the first to the second support plate but may instead extend partly from the first support plate to the second support plate as shown in FIG. 1.

Spacers (not shown) between the first and second support plates, for example between the walls on the first support plate and the second support plate, may be used to reduce the displacement of the first and second support plates relative to each other, thereby reducing unwanted effects. Such unwanted effects include for example a "lowered ceiling effect" which may occur when pressure is exerted on the second support plate, for example by a finger, causing the second support plate to move towards the first support plate. If the distance between the support plates becomes small enough, the liquid of the first layer will adhere to the second support plate, reducing the display quality. A further undesirable display effect which may be reduced by arranging spacers between the first and second support plates is what may be referred to as a "tsunami effect". This can occur if a pressure pulse is exerted on the second support plate creating a shock wave, which may cause the liquid of the first layer to flow over a picture element wall.

The extent of the display element, indicated by the dashed lines 3 and 4, is defined by the center of the walls 21. The area of the surface between the walls of a display element, indicated by the dashed lines 22 and 23, is called the display area 24, over which a display effect occurs. The area of the surface on which the walls are formed may be referred to as the wall area. An extent of the surface 14 corresponding to the extent of the display area is in this example hydrophobic. The display effect depends on an extent that the liquids of the first and second layers adjoin the surface defined by the display area, in dependence on the magnitude of the applied voltage V described above. The magnitude of the applied voltage V therefore determines the configuration of the liquids of the first and second layers within the electrowetting element. In other words, the display effect depends on the configuration of the liquids of the first and second layers in the display element, which configuration depends on the magnitude of the voltage applied to the electrodes of the display element. The display effect gives rise to a display state of the display element for an observer looking at the display device. When switching the electrowetting element from one liquid configuration to a different liquid configuration the extent of the liquid of the second layer adjoining the display area surface may increase or decrease, with the extent of the liquid of the first layer adjoining the display area surface decreasing or increasing, respectively.

A sealing element (not shown) arranged on the first support plate 5 defines the lateral extent, i.e. a periphery, of the electrowetting device 1 in the example of FIG. 1. The sealing element may be used to confine the first and second layers 11, 12 to the electrowetting device 1. Additionally or alternatively, the sealing element may be used to seal the first support plate 5 to the second support plate 6. In examples, the sealing element seals a perimeter of the electrowetting device 1 and therefore may be formed as a rectangular or square shaped seal for example for surrounding a matrix of display elements of the electrowetting device 1 being manufactured. Therefore, the sealing element may be provided on the first support plate 5 with a suitable shape and of sufficient thickness for coupling the first support plate 5 to the second support plate 6. The sealing element may be hydrophilic to aid sealing of the electrowetting device 1.

Figure 2:
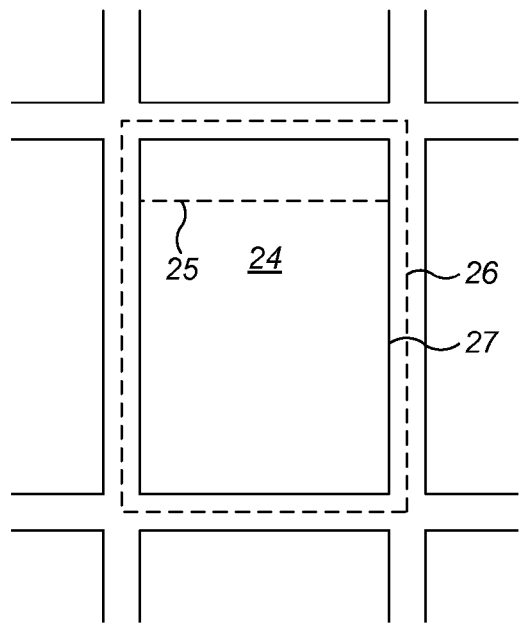
FIG. 2 shows schematically a plan view of example display elements.

FIG. 2 shows a matrix of rectangular picture elements in a plan view of the hydrophobic surface of the first support plate. The extent of the central picture element in FIG. 2, corresponding to the dashed lines 3 and 4 in FIG. 1, is indicated by the dashed line 26. Line 27 indicates the inner border of a wall; the line 27 is also the edge of the display area 24.

When a zero or substantially zero voltage is applied between the electrodes 17 and 19, i.e. when the electrowetting element is in an off state, the liquid of the first layer 11 forms a layer between the walls 21, as shown in FIG. 1. Application of a voltage will contract the liquid of the first layer, for example against a wall as shown by the dashed shape 25 in FIG. 1 or FIG. 2. The controllable shape of the liquid of the first layer, in dependence on the magnitude of applied voltage, is used to operate the picture element as a light valve, providing a display effect over the display area 24. For example, switching the liquids of the first and second layers to increase adjoinment of the liquid of the second layer with the display area may increase the brightness of the display effect provided by the element. This display effect determines the display state an observer will see when looking towards the viewing side of the display device. The display state can be from black to white with any intermediate grey state; in a colour display device, the display state may also include colour.

Examples of at least part of a method of manufacture of an electrowetting device will now be described. Specifically, these examples describe manufacture of an electrowetting display device in accordance with FIGS. 1 and 2. It is to be appreciated that the method applies to manufacture of other types of electrowetting devices different from those specifically described with FIGS. 1 and 2.

Figure 3:
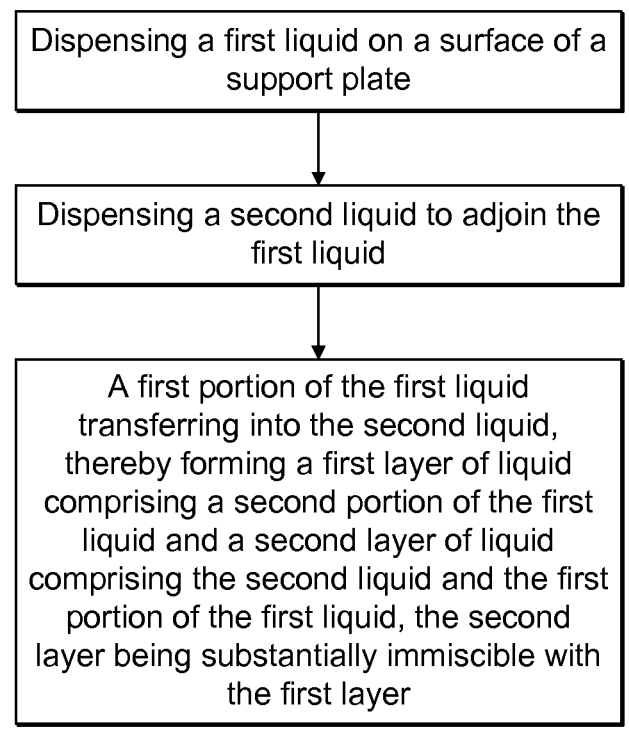
FIG. 3 is a flow diagram relating to examples of part of a method of manufacturing an electrowetting device.

FIG. 3 shows a flow diagram of part of a method of manufacturing an electrowetting device according to examples described herein. The example method of FIG. 3 includes dispensing a first liquid on a surface of a support plate. A second liquid is dispensed to adjoin the first liquid. A first portion of the first liquid transfers into the second liquid. Transferring of the first portion in this way forms a first layer of liquid, for example the first layer of liquid 11 described above, and a second layer of liquid, for example the second layer of liquid 12 described above, which is substantially immiscible with the first layer. The first layer of liquid formed using this method comprises a second portion of the first liquid. The second layer of liquid comprises the second liquid and the first portion.

Figure 4:
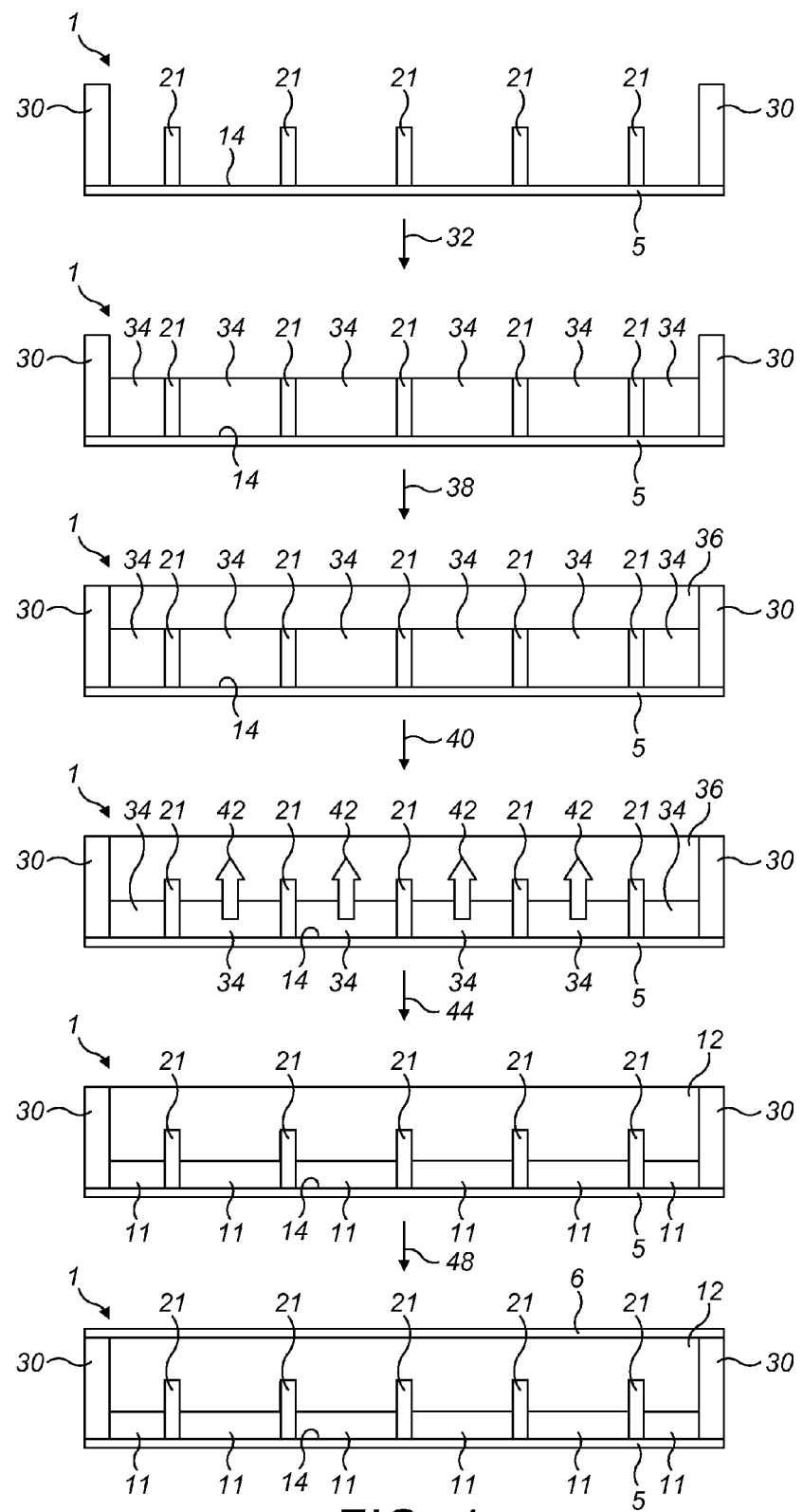
FIG. 4 shows schematically an example of part of a method of manufacturing an electrowetting device.

An example of part of a method of manufacturing an electrowetting device, for example an electrowetting display device, is shown schematically in FIG. 4. This method is an example of the examples of FIG. 3, though it is to be appreciated that further examples may be envisaged which accord with FIG. 3 but which have some features in common with and/or are different from those described using FIG. 4, as the skilled person will understand.

As the skilled person will understand, this example method of FIG. 4 includes providing a support plate. The support plate may be provided at least partially pre-assembled; in this example, the support plate is the first support plate 5 as described above with reference to FIG. 1. For clarity of illustration, in FIG. 4, the first support plate 5 is shown schematically as a single layer with walls, without showing the separate layers forming the support plate. A sealing element 30, for example the sealing element described above with reference to FIG. 1, is arranged on the first support plate 5 and forms the extent of the electrowetting device 1.

The method of FIG. 4 includes dispensing 32 a first liquid 34 on the surface 14 of the first support plate 5. Examples of a suitable first liquid 34 are described in more detail below.

Dispensing 32 of the first liquid 34 on the surface 14 of the first support plate 5 may be performed using any suitable liquid supply system. The term "dispensing" in examples refers to any appropriate method of disposing, depositing or applying the liquid 34 on the first support plate 5. For example, the one-drop-fill (ODF) method, as disclosed in the article "Development of the One Drop Fill Technology for AM-LCDs" by Kamiya et al, SID 01 Digest page 1354, 2001 (ISSN/0001-0966X/01/3201-1354), may be used. This method includes depositing, for example dropping, a predetermined amount of the first liquid 34 onto the first support plate 5. The apparatus for performing the ODF method (not shown) may use one or more nozzles for dispensing 32 the first liquid 34 on the first support plate 5. Alternatively, a slit-filling method (which is well known in the art) may be used to dispense the first liquid 34 on the first support plate 5. In an example of a slit-filling method, there is an elongate gap between an applicator and the surface of the first support plate 5. The elongate gap is filled with an elongate globule of the first liquid 34. The applicator and the first support plate 5 are moved relative to each other, thereby dispensing the first liquid 34 on the surface of the first support plate 5.

The first liquid 34 is dispensed so it adjoins the surface 14 of the first support plate 5, with no intermediary between the surface 14 and the first liquid 34.

The surface 14 of the first support plate 5 on which the first liquid 34 is dispensed is a hydrophobic surface in the example of FIG. 4. In other examples, the first liquid may be dispensed on a surface of a support plate with other wettability properties, as described further below.

The example method of FIG. 4 also includes dispensing 38 a second liquid 36; examples of the second liquid 36 are described below. In the example of FIG. 4, the second liquid 36 is dispensed on an upper surface of the first liquid 34. In this example, the volume of the first liquid 34 dispensed on the surface 14 of the first support plate 5 has a thickness substantially equal to a height of the walls 21, the height being substantially parallel to the thickness. The term "substantially equal to" in examples refers to a thickness of the first liquid which is within 10% or 5% of the height of the at least one wall. The term "substantially parallel to" in examples refers to an angular difference between the height and the thickness of within 10 degrees. Therefore, the second liquid 36 adjoins the tops of the walls 21 where the walls 21 are arranged, i.e. outside the display area, and adjoins the first liquid 34 in the display area. Accordingly, dispensing the first liquid 34 with a thickness substantially equal to a height of the walls 21 allows the first layer 11 to be obtained with a thickness which is less than the wall height, due to transfer of the first portion, as described later. Such a thickness is difficult to obtain with known methods of manufacture which for example rely on changing a solid to a liquid. In other examples in which the first liquid has been dispensed with a thickness exceeding the height of the walls, the second liquid may not adjoin the walls, though in such examples transfer of the first portion may still yield a final thickness of the first layer which is less than the wall height.

The second liquid 36 can be dispensed using any suitable liquid deposition method, for example using the ODF or slit-filling methods described above or a curtain dispensing method in which, for example, a substrate is passed through a stream of the second liquid, for example in the form of a cascade or waterfall of second liquid, such that the second liquid is deposited or coated on the substrate. In some examples, the first liquid and the second liquid are independently dispensed using one of: a one-drop-fill method or a slit-filling method. For example, the first liquid and the second liquid may each be dispensed separately using a one-drop-fill or a slit-filling method. In other words, the first liquid may be dispensed using the same or a different method from that used for dispensing the second liquid.

The method of FIG. 4 includes dispensing the second liquid 36 to adjoin the first liquid 34. As referred to in examples described herein, "to adjoin" refers to contact or touching between the first liquid and the second liquid, for example such that there is a meniscus separating the first liquid and the second liquid and defining a surface of contact, i.e. an interface, between the first liquid and the second liquid.

The example method of manufacture of FIG. 4 includes a first portion (not shown) of the first liquid 34 transferring 40 into the second liquid 36. This transfer is illustrated schematically in FIG. 4 with arrows labelled 42. The first portion of the first liquid 34 transferring 40 into the second liquid 36 forms 44 a first layer of liquid 11 and a second layer of liquid 12 substantially immiscible with the first layer 11. Further details are described later.

The example method of FIG. 4 includes applying 48 the second support plate 6 on the second layer 12 and sealing the second support plate 6 to the first support plate 5 with the sealing element 30. This thereby encloses the first layer 11 and the second layer 12 within a sealed chamber for the electrowetting device 1. The sealing element 30 is a curable and mouldable compound such that compression of the sealing element 30 between the first support plate 5 and the second support plate 6 applies pressure to the sealing element 30, adhering the sealing element 30 to both the first and second support plates 5, 6. Ultraviolet light (not illustrated) is then applied to cure the sealing element 30 and thereby seal the electrowetting device 1. In other examples, the sealing element is a pressure sensitive adhesive. Examples other than those in accordance with FIG. 4 may also include use of a sealing element. For example, a sealing element may be first adhered to the second support plate and not the first support plate. Then, after or while applying the second support plate on the layer of the second layer, the sealing element may be adhered to the first support plate by compressing the first and second support plates together.

As explained above, in a known method of manufacture, at least one of the liquids in an electrowetting device is provided in solid form and then changed to liquid form. Due to the change in volume as a result of the phase change from solid to liquid, dispensing a precise quantity of the at least one of the liquids is difficult. The method of examples described herein overcomes this difficulty by dispensing liquids for the device in liquid form. By for example dispensing the first liquid as a solution or an emulsion, accurate liquid volume dispensing is possible, without splashing for example which might otherwise reduce the accuracy of volume dispensing.

Furthermore, in the known method, liquids in the manufactured device contain contaminants from the solid, such as gelling agents, which can reduce the performance of the device. The first and second liquids dispensed in examples of the method described herein do not suffer in this way, meaning there is greater design freedom for selecting compounds of a liquid composition and/or performance of the manufactured device is improved compared with that from the known method. Moreover, compared with the known method, no special process equipment for handling both solids and liquids is required; instead simple liquid dispensing techniques can be used, meaning that the method according to examples is straightforward and cheap to implement. For example, to apply a thin layer of a gel in a known method it may be necessary to heat the gel, requiring an extra process step. Furthermore, heating of the gel may make it less viscous, which can adversely affect the display quality of the manufactured electrowetting device. In the method according to examples described herein, the first liquid and the second liquid may be dispensed without such heating, avoiding the adverse effects of the known method.

The term "liquid" referred to herein refers in examples to a material having a non-fixed shape, i.e. a material which flows to adopt a shape of at least part of its container, and in the absence of such a container, flows to spread itself to form a layer of the liquid. A liquid is a fluid and is not a solid or a gas. A solid is for example a material having a fixed shape which, without energy input, maintains its shape and does not flow in the manner of a liquid as explained above; in other words a solid is stable in shape and is not fluid in nature. A gas is for example a material which expands freely to fill any space available irrespective of its quantity.

In examples of those examples described herein, a liquid and a portion of a liquid are formed only of liquid materials and hence the liquid and portion of the liquid exhibit liquid properties. However, in other examples of those described herein, the liquid and/or portion may each as a whole perform as a liquid, but may comprise non-liquid material, for example solid particles such as a pigment. Thus, a liquid referred to herein may comprise more than one distinct or separable chemical species, each of which may be a liquid itself. A liquid may comprise one or more solid species, for example pigment particles, in a sufficiently small quantity that the liquid itself retains the physical properties of a liquid. For example, a small quantity of solid particles may be dispersed through the liquid, for example as a suspension. The term "portion" of a liquid used herein refers in examples to one species of a liquid or to one volume of a liquid having a different property than a different portion. A portion of a liquid may in other examples referred to herein comprise more than one different type of liquid molecule.

Examples of the method of manufacturing an electrowetting device, such as the example method described above with reference to FIG. 4, allow accurate dosing, i.e. dispensing, of the first portion of liquid on the support plate. Transfer of the first portion into the second liquid reduces the volume of the first liquid, and hence determines the thickness of the first layer which is formed. Hence, a larger quantity of first liquid may be dispensed than required for the first layer for use in the manufactured electrowetting device. This allows simpler dispensing techniques to be used, for example those which can move over a top surface of walls of a support plate, without having to dose individual pixels. In examples, the method allows a concentration of one or more dyes in the first layer to be increased compared with a known method of manufacture. For example, the first portion may assist in dissolving the one or more dyes in the first liquid dispensed on the surface of the support plate. This may increase the amount of the one or more dyes that are dissolved in the first layer formed by the transferring of the first portion into the second liquid.

In examples, the magnitude of inherent uncertainties in the quantity of first liquid dispensed may be independent of the quantity of the first liquid dispensed, i.e. they may be irreducible, for example due to manufacturing tolerances. In such examples, use of the method of examples can reduce the proportional, i.e. relative, uncertainty associated with dispensing the first liquid by dispensing a larger quantity of first liquid in order to form a first layer with a particular thickness. In examples, this therefore reduces the relative uncertainty associated with depositing the first layer on the support plate, allowing a given quantity of the first layer to be dispensed more accurately.

In an example, an electrowetting display device made according to an example of the method has a more uniform quantity of liquid of the first layer in each pixel, i.e. with a smaller variation in the quantity of liquid of the first layer in each pixel, compared with an electrowetting display device made using a known method of manufacture. Therefore, images displayed by the electrowetting display device made according to an example of the method have a more even display quality than images displayed by the electrowetting display device made according to the known method.

In examples, for example that of FIG. 4, the first portion transferred into the second liquid has a pre-determined volume such that, after transferring the first portion into the second liquid, the second layer has a pre-determined volume for a manufactured electrowetting device. In examples, the first liquid is formed of the first portion and the second portion, such that the second portion is the remaining portion of the first liquid after transferring the first portion into the second liquid, i.e. the portion of the first liquid which is not the first portion. Therefore, in such examples, transferring a pre-determined volume of the first portion determines the volume of the first liquid remaining, i.e. the volume of the second portion, which is pre-determined in accordance with the pre-determined volume of the first portion. In these examples, the second portion forms the first layer of liquid; in other words, the first layer has the pre-determined volume of the second portion. Hence, controlling the pre-determined volume of the first portion which is transferred from the first liquid allows the volume of the first layer to be controlled. As referred to herein, the pre-determined volume of the first portion which transfers into the second liquid may be the same as or different from the pre-determined volume of the second portion which remains and is comprised within the first layer.

In examples described herein, the term "layer" refers to a coating, covering or quantity of a liquid on an element, for example on another liquid or on a support plate, which, in some cases, for example where an underlying surface beneath the layer has a planar surface parallel to the horizontal, may have a substantially uniform thickness. The first layer of liquid remains distinct from the second layer of liquid due to the substantial immiscibility of the liquids of the first layer and the second layer; as described above, there may be a meniscus at a boundary between the first and second layers. Thus, a gradient for transfer of molecules of the first portion to the second liquid may be set up. The greater attraction and hence the gradient for transfer may be due to first portion molecules having a greater polarity than the second portion but less than the second liquid.

In examples such as the example of FIG. 4, dispensing the second liquid to adjoin the first liquid initiates the first portion transferring into the second liquid. This transfer may be considered to occur spontaneously, for example without additional stimulus, once the first liquid and the second liquid are brought into contact. Dispensing the second liquid so it adjoins the first liquid can therefore be considered to trigger the transfer of the first portion into the second liquid. This provides a simple method of transferring the first portion into the second liquid which in examples requires no further action other than dispensing the first and second liquids to adjoin each other to cause the transfer to begin.

Transfer of a first portion of the first liquid into the second liquid may, spontaneously or otherwise, for example, occur where the first portion has a greater affinity for the second liquid than for the second portion. This may be the case where the first portion is more miscible with the second liquid than with the second portion, for example due to a greater attraction between molecules of the first portion and the second liquid than between the first portion and the second portion.

Alternatively or in addition to the greater affinity, transfer of the first portion may occur where the first portion has a greater solubility with the second liquid than with the second portion. Solubility in examples is an indication of the tendency of the first portion to dissolve in, i.e. to mix with, the second liquid or the second portion to form a homogeneous solution. This greater solubility can help drive the transfer.

In other examples, the first portion may have an affinity of a different type which is larger for the second liquid than for the second portion.

The term "affinity" used herein in relation to transferring of the first portion in examples relates to attractive forces between different liquids and/or portions of liquids. The affinity may be sufficient that a mixture of a different portion and/or liquid remains mixed in a stable configuration, i.e. a configuration which remains substantially the same, for example as a homogeneous liquid, over a length of time, for example of the order of months or years. In examples of the method, for example as described above with reference to FIG. 4, the affinity of the first portion of the first liquid for the second liquid is such that the first portion transfers out of the first liquid and into the second liquid, thereby forming a stable second layer. By virtue of the first portion leaving the first liquid, the first liquid forms a first layer of liquid. The first and second layers which are formed are sufficiently immiscible that they remain substantially separate and distinct, as described above with reference to FIG. 1.

As explained above, in examples, transfer of the first portion of the first liquid into the second liquid upon bringing the second liquid and the first liquid into contact simplifies the production process of the electrowetting device, meaning that no additional step needs to be performed to stimulate the transfer. However, other example methods of manufacture of the electrowetting device may include at least one of: heating, sonicating, agitating, stirring or vibrating to initiate and/or assist the first portion of the first liquid transferring into the second liquid. One or more of these stimuli may be applied to speed up transfer of the first portion into the second liquid or may be used, in some examples, for a first liquid and a second liquid for which transfer of the first portion does not occur spontaneously upon adjoinment of the first liquid with the second liquid.

As explained above, a surface of the support plate in examples may have particular wettability properties. In an example, the surface has a lower wettability for the first portion than for the second portion, and may be hydrophobic. This can aid the transfer of the first portion from the first liquid and away from the surface on which the first liquid is dispensed and into the second liquid, as the first portion prefers not to wet the support plate compared with the second portion. Conversely, the surface has a higher wettability for the second portion, which therefore prefers to wet the support plate, displacing any of the first portion from the surface and causing it to move away from the support plate and towards the second liquid, improving transfer of the first portion into the second liquid.

In examples, the first liquid is a liquid mixture comprising the first portion mixed with the second portion. The term "liquid mixture" may refer in examples to a first portion being dispersed substantially homogeneously throughout the liquid mixture, in other words sufficiently homogeneously that any two samples of equal volume of the liquid mixture contain approximately the same amount, for example volume, of the first portion, for example the same amount within plus or minus 10%. In examples described herein, a liquid mixture is itself a liquid; two portions mixed together but which as a mixture form a solid is not a liquid mixture. The term "mixture" in examples refers to a physical combination of two or more components (each component being for example a different chemical compound) with each of the two or more components retaining its own chemical identity. For example such a mixture may be a solution, possibly with physical interactions between the different chemical molecules. Hence, in a mixture the two or more components are not chemically reacted with each other to form a different species. FIG. 4 illustrates an example method which uses a liquid mixture.

In examples, such as the example of FIG. 4, the method includes mixing the first portion and the second portion together to form a liquid mixture, such as the first liquid 34, before the first liquid is dispensed on the surface of the first support plate and before dispensing the second liquid. In some examples, the liquid mixture is dispensed immediately after it is made or after only a short or minimal period of time has elapsed after it has been made. This may be achieved by arranging a device for making the mixture as a unit in apparatus for dispensing the first liquid and/or the second liquid, thereby reducing the time between making the liquid mixture and dispensing it as the liquid. This may be desirable where the liquid mixture is unstable and will only remain in the form of a mixture for a short period of time. Such a mixture can be advantageous as surfactants or other stabilising additives which might otherwise contaminate the liquids are unnecessary.

In examples, the first portion mixes with the second liquid after it has transferred from the first liquid into the second liquid, as for the example in FIG. 4. Therefore, the second layer in these examples comprises a liquid mixture of the first portion with the second liquid. However, in other examples, the first portion may not homogeneously mix with the second liquid. In such cases, the first portion may nevertheless be more miscible or have a greater affinity or solubility with the second liquid than with the second portion such that the first portion transfers to the second liquid, without the first portion being miscible or soluble in the second liquid.

In examples such as FIG. 4, the first portion which is transferring to the second liquid is at least one of: electrically conductive or polar, i.e. it might be electrically conductive, polar, or both, i.e. electrically conductive and/or polar. As described above, in examples the second layer itself, which comprises the second liquid and the first portion, may be electrically conductive and/or polar to provide correct operation of the electrowetting device. While the second layer may be electrically conductive and/or polar even if the first portion itself is not electrically conductive and/or polar, for example where the first portion forms a relatively small proportion of the second layer, the electrical conductivity properties or polar properties of the second layer may in examples be enhanced where the first portion is electrically conductive and/or polar.

In examples, the first portion and second liquid may be composed of different compounds, which when mixed together form the second layer with its desired characteristics. Therefore, depending on the compounds involved, and/or the technique of dispensing the liquids and/or the desired properties of the second layer, the first portion and the second liquid are each composed to provide at least one of a light reflection characteristic, a light transmission characteristic, a colour filtering characteristic, a viscosity characteristic, an electrical conductivity characteristic, a polarity characteristic, or an immiscibility characteristic for the second layer.

Examples of the first liquid dispensed on the surface of the support plate in the method according to examples will now be described in more detail.

In some examples, the first liquid is a solution of, i.e. comprising, the first portion and the second portion, the first portion being more soluble with the second liquid than with the second portion. In these examples, the solution is itself a liquid and is an example of a liquid mixture described above. The term "more soluble" in examples refers to the first portion having a greater solubility, as explained above, with the second liquid than with the second portion. The first liquid is considered to be a solution in examples when it comprises a substantially homogeneous mixture of the first portion with the second portion, i.e. with molecules of the first portion and the second portion approximately evenly distributed throughout the first liquid. For example an average, such as a mean, spacing between adjacent molecules of a part of the first portion may be approximately the same or the same as an average spacing between adjacent molecules of a different part of the first portion. In examples, the first portion is the solute and the second portion is the solvent; in such examples, the second portion may form the majority of the mixture by volume. In other examples, the first portion may be the solvent and the second portion may be the solute. In examples in which the first liquid is a solution, the first liquid may comprise other components besides the first portion and the second portion.

The greater solubility of the first portion with the second liquid than with the second portion, with which it is in solution in the first liquid, causes the first portion to transfer to the second liquid for example when the first liquid and the second liquid are brought into contact with each other. Thus, this facilitates transfer of the first portion to the second liquid. After transfer of the first portion to the second liquid, the first portion and the second liquid form a liquid solution. This is because, if the first portion is sufficiently soluble in the second portion to form a solution yet is more soluble with the second liquid, the first portion is accordingly also sufficiently soluble in the second liquid to be able to form a solution.

In some examples, where the first liquid is a solution of the first and second portions, the first portion is formed of at least one liquid with an octanol-water partition coefficient of a value within the range of approximately −0.5 to approximately 0.5. Approximately means the value is within acceptable measurement tolerances. In some examples, the range is −0.5 to 0.5. For example, a value may be one of: approximately −0.5, −0.5, −0.4, −0.3, −0.2, −0.1, approximately 0, 0, 0.1, 0.2, 0.3, 0.4, 0.5, or approximately 0.5.

The octanol-water partition coefficient is a well-known parameter in the art and is a ratio between a concentration of a compound (i.e. a solute) dissolved in a first phase of octanol and a concentration of the compound dissolved in a second phase of water. The octanol-water partition coefficient is therefore a useful measure of a compound's solubility in each phase of two substantially immiscible phases (of octanol and un-ionised water).

The octanol-water partition coefficient is for example represented by Log P (and may otherwise be referred to as Log Kow) and is calculated according to the following formula:

$$\log P_{octanol/water} = \log\left(\frac{[solute]_{octanol}}{[solute]_{water}}\right)$$

For example, the compound in examples described herein is a liquid forming at least part of the first portion.

In an example where the second portion comprises decane and the second liquid comprises ethylene glycol and glycerol, at least one liquid of the first portion has a value in the range of approximately −0.5 to approximately 0.5 for the octanol-water partition coefficient (otherwise referred to as the partition coefficient) as explained above. In other examples where the second portion comprises decane and the second liquid comprises predominantly water, at least one liquid of the first portion has a value in the range of approximately −0.5 to approximately 0. The meaning of the term approximately is explained above. In this range the value may therefore be approximately −0.5, −0.5, −0.4, −0.3, −0.2, −0.1, 0, or approximately 0. In further examples where the second portion comprises a different compound than described above at least one liquid of the first portion may have a partition coefficient value within a different range than those examples given above. However, the value would be selected such that the first portion is sufficiently soluble with the second portion so as to form a solution for dispensing as a liquid but yet such that the first portion transfers to the second liquid when required during manufacture to form the first layer and the second layer for the manufactured device. In other words, the partition coefficient of the second portion sets the lower limit of an acceptable partition coefficient for the first portion and the partition coefficient of the second liquid sets the upper limit of an acceptable partition coefficient for the first portion. In other words, the first portion has a value of the partition coefficient between the partition coefficient of the second portion and the second liquid. For example, the first portion has an octanol-water partition coefficient value which is at least one of: lower than an octanol-water partition coefficient value of the second liquid; or greater than an octanol-water partition coefficient value of the second portion.

In examples, the first portion comprises one or more compound of at least one of the following classes: an alcohol, an ether, an ester, a ketone, an amide, a carbonate, or a nitrile.

An alcohol referred to herein includes the group R1-C(R2)(R3)-OH where C is a saturated carbon, —OH is a hydroxyl functional group and R1, R2 and R3 are each independently H or an alkyl group or an aryl group referred to herein. An alcohol referred to herein may be a monohydric alcohol, i.e. an alcohol with only one —OH group, or a polyol having more than one —OH group. The first portion may for example comprise at least one of: isopropanol ($CH_3$—CH(OH)—$CH_3$), butanol ($C_4H_9OH$), for example 1-butanol, 2-butanol, 2-methyl-1-propanol, or 2-methyl-2-propanol, or combinations thereof, or a polyethylene glycol having the general formula H—[$OCH_2CH_2$]n-OH, where n is an integer. In some examples, the first portion includes an alcohol having up to 4 carbon atoms, i.e. the alcohol in different examples has 1, 2, 3 or 4 carbon atoms. In examples therefore the alcohol may be methanol, ethanol, propanol or butanol.

An alkyl group referred to herein is for example a monovalent straight chain, branched or cyclic alkyl group. An aryl group referred to herein is for example a monovalent aromatic hydrocarbon having for example 5, 6 or 7 carbon atoms. Any such aryl group may be substituted on at least one aromatic carbon by for example an alkyl group as defined herein or a different substituent. The aryl group may have one, two, three, four or five substituent groups, for example. Such an aryl group may for example be a phenyl group.

An ether referred to herein includes the group R4-O—R5. —O— is an oxygen atom linked by a single bond to R4 and R5 where each of R4 and R5 is an alkyl group or an aryl group described herein. The first portion may for example comprise at least one of: tetrahydrofuran ($(CH_2)_4O$), also known as oxolane, diglyme ($CH_3$—O—$CH_2CH_2$—O—$CH_2CH_2$—O—$CH_3$), 1,4-dioxane ($(CH_2)_2O_2$), dimethoxyethane ($CH_3$—O—$CH_2CH_2$—O—$CH_3$), or 1,2,3-trimethoxypropane (($H_3COCH_2)_2CHOCH_3$)

An ester referred to herein is a group with a carbon atom linked by a double bond to an oxygen atom (i.e. a carboxyl group —C=O) and further linked by a single bond to an oxygen atom which in turn is bonded to an alkyl or an aryl group described herein. Such an ester group may therefore have the formula —C(=O)—O—R6, i.e. —COOR6, where R6 is an alkyl or aryl group described herein. The first portion may for example comprise at least one of: methyl acetate ($CH_3C$(=O)—$OCH_3$), or methyl lactate ($CH_3C$(—OH)—C(=O)—$OCH_3$).

A ketone referred to herein is a group having the formula R7-C(=O)—R8, where C is a carbon atom linked by a double bond to an oxygen atom and also linked by a single bond to each of R7 and R8, with R7 and R8 being an alkyl group or an aryl group as described herein. The first portion may for example comprise at least one of: acetone (($CH_3)_2$C=O), cyclopentanone (($CH_2)_4$C=O), methyl ethylketone ($CH_3C$(=O)—$CH_2CH_3$), or cyclohexanone (($CH_2)_5$C=O)

An amide referred to herein includes a group with a nitrogen bonded to a carboxyl group, with the nitrogen being further substituted by any two of a hydrogen atom, an alkyl group or an aryl group described herein, i.e. an amide for example has the formula —C(=O)N(R10)-R11 where R10 and R11 each indicate an alkyl or aryl group described herein. The first portion may for example comprise: N-methylpyrrolidone $((CH_2)_3C(=O)-N(CH_3))$.

A carbonate referred to herein is a group having the general formula $O=C(-O-R12)-O-R13$, where R12 and R13 are each an alkyl group or an aryl group as described herein. In other words a carbonate group includes a carbon atom linked by a double bond to an oxygen atom and further linked by a single bond to two other oxygen atoms, which two other oxygen atoms are in turn linked by a single bond to an alkyl group or an aryl group. The first portion may for example comprise: dimethylcarbonate $(C(=O)(OCH_3)_2)$.

A nitrile referred to herein is the group —CN, i.e. a carbon atom with a triply bonded nitrogen substituent. Such a group might alternatively be referred to as a cyano group, i.e. a carbon atom bonded with a triple bond to a nitrogen. The first portion may for example comprise at least one of: acetonitrile $(H_3C-CN)$, or propionitrile $(CH_3CH_2-CN)$, In some examples, any of the compounds of the first portion may be cyclic, for example a cyclic ether, cyclic ester, cyclic ketone, cyclic carbonate, or consist of a cyclic structure substituted with a functional group, for example an alcohol or nitrile as substituent to a cyclic structure. In addition a cyclic compound can be a combination of both a cyclic compound and a functional group attached to the cyclic compound.

In examples, the first portion comprises one or more of: isopropanol $(CH_3-CH(OH)-CH_3)$, butanol, for example any example of butanol given above, a polyethylene glycol having the general formula $H-[OCH_2CH_2]n-OH$, where n is an integer, tetrahydrofuran $(CH_2)_4O)$, diglyme $(CH_3-O-CH_2CH_2-O-CH_2CH_2-O-CH_3)$, 1,4-dioxane $(CH_2)_2O_2$, dimethoxyethane $(CH_3-O-CH_2CH_2-O-CH_3)$, 1,2,3-trimethoxypropane $HC(-CH_2-O-CH_3)_3$, methyl acetate $(CH_3C(=O)-OCH_3)$, methyl lactate $(CH_3C(-OH)-C(=O)-OCH_3)$, acetone $((CH_3)_2C=O)$, cyclopentanone $((CH_2)_4C=O)$, methyl ethylketone $(CH_3C(=O)-CH_2CH_3)$, cyclohexanone $((CH_2)_5C=O)$, N-methylpyrrolidone, dimethylcarbonate $(C(=O)(OCH_3)_2)$, acetonitrile $(H_3C-CN)$, or propionitrile $(CH_3CH_2-CN)$.

The second portion in examples has the properties and composition described above with reference to FIG. 1 for the first layer of liquid 11. For example, the second portion may be electrically non-conductive; it may also be non-polar. It may be, for example, an alkane like decane $(CH_3(CH_2)_8CH_3)$ or hexadecane $(CH_3(CH_2)_{14}CH_3)$, a silicone oil like for example hexamethyldisiloxane $O-(Si(CH_3)_3)_2$, or decalin (otherwise known as bicyclo-4,4,0-decane $(C_{10}H_{18})$).

Examples of the second liquid will now be described in further detail.

In examples of the second liquid, the second liquid is at least one of electrically conductive or polar and may be considered to be an electrolyte. "Electrically conductive" for example means that the second liquid is capable of conducting electricity; for example an electrical current may flow through the second liquid due to the flow of ions for example through the second liquid. "Polar" in examples means that the second liquid comprises at least one compound (for example a liquid vehicle) having a molecule with a net dipole; i.e. that across the molecular structure the molecule has an overall dipole moment, due to an electron distribution, with at least one part of the molecule having a negative electrical charge and at least one different part of the molecule having a positive electrical charge. Such dipole moments include permanent dipoles. The polarity is caused for example by the presence of one or more atom to atom bond in the molecule, with for example one of the atoms being a heteroatom such as oxygen or nitrogen. For example, such a polar atom to atom bond is a bond between an oxygen (O) atom and a hydrogen (H) atom, i.e. an —O—H bond, which may be in some examples due to the presence of at least one hydroxyl (—OH) group. The presence of such bonds may cause hydrogen bonding between different molecules within the second liquid.

In examples, the second liquid comprises at least one of water, a polyether; a peroxide; a polyol such as a diol, a triol and/or a tetraol; an ether; dioxalane; dimethoxymethane; an amide; a polyamide; a carboxylic acid; formic acid; acetic acid; propanoic acid; glycolic acid; a heteroatom substituted carboxylic acid; a halogenated carboxylic acid; chloroacetic acid; trifluoroacetic acid; a dicarboxylic acid; oxalic acid; malonic acid; succinic acid; and/or glutaric acid; a tricarboxylic acid; citric acid; aconitic acid; an ester; methyl acetate; ethyl lactate; a sulphone; dimethyl sulphate; dimethyl sulphite; methylsulphonylmethane; an aldehyde; acetaldehyde; glyoxal; methylglyoxal; a peroxide; methyl ethyl ketone peroxide; oxamic acid; organosulphoxide; ethylene carbonate; propylene carbonate; diethylene glycol; polyethylene glycol; propylene glycol; erythritol; ethylene glycol; glycerol; butanetriol; derivatives thereof; or combinations thereof. A heteroatom in examples is for example nitrogen (N), sulphur (S), boron (B) or phosphorus (P) or a halogen atom such as chlorine (Cl), fluorine (F), bromine (Br) or iodine (I).

In some examples, the second liquid comprises a non-aqueous component selected from the group consisting of: ethylene glycol; diethyleneglycol; polyethylene glycol; propylene glycol; dioxalane; glyoxal; citric acid; oxalic acid; oxamic acid; glycerol; or formic acid. In further examples, the second liquid includes a different second non-aqueous component selected from the group consisting of: erythritol; ethylene carbonate; propylene carbonate; ethylene glycol; glycerol; and butanetriol. In some such examples the non-aqueous components of the second liquid are ethylene glycol and ethylene carbonate, ethylene glycol and propylene carbonate, ethylene glycol and glycerol, diethylene glycol and glycerol, or polyethylene glycol and glycerol. In some such examples described above, the second liquid comprises zero, approximately zero, or a hygroscopic amount of water, for example a maximum hygroscopic amount of water, in addition to the non-aqueous components. In other examples, the second liquid comprises more than a hygroscopic amount of water, in addition to the non-aqueous components, for example the water content of the second liquid is at least one of: less than 35 wt %, 30 wt % or less, 15 wt % or less, 10 wt % or less, 5 wt % or less, 3 wt % or less, 1.5 wt % or less, 5 wt % or greater, 0.5 wt % or greater, 0.05 wt % or greater, for example 0.5 wt % to 15 wt %, or 0.05 wt % to 15 wt %, or 0.05 wt % to 1.5 wt %, or 0 to 0.5 wt %. In some such examples including water, the second liquid has suitable properties in combination with the chemical and physical properties of the first portion which transfers into the second liquid to form the second layer to provide suitable switching and/or reflective properties for the electrowetting device. Further details of examples of the composition of the second liquid are included herein by way of reference to PCT patent application no. PCT/EP2011/060114.

Where the first portion comprises any one or a combination of any compound of a compound class or of a specific example of a compound listed above, the first portion in examples forms a solution with any of the examples of the second portion described above. In such examples, the first portion may be more soluble with the examples of the second liquid given above than with the second portion.

Examples are envisaged which comprise any combination of a compound listed herein for the first portion and the second portion of the solution, and/or the second liquid. Further derivatives and combinations of any of the liquid compounds described herein are envisaged, for the method of manufacture described herein.

In other examples, the first liquid is an emulsion of, i.e. comprising, the first portion and the second portion. The first portion may be more soluble with the second liquid than with the second portion, where the term "more soluble" is as referred to above. Examples of compounds for the first portion of the emulsion include any of the compounds listed above for the first portion, or any of the compounds listed above for the second liquid. The second portion of the emulsion may be any of the compounds listed above for the second portion. In such examples, a concentration of any such compound may be sufficiently high to form an emulsion compared with a solution of different examples described herein. Moreover, in examples, a group such as an alkyl group with a greater number of carbon atoms than described previously, for example five carbon atoms or more, or ten carbon atoms or more, may be selected to encourage formation of an emulsion rather than a solution using compounds with fewer carbon atoms (such as four carbon atoms or less).

As will be appreciated by the person skilled in the art, several methods can be used to make an emulsion. The methods may include the use of any of a combination of a capillary channel, a homogeniser, a homomixer, a colloid mill, an ultrasonic homogeniser, an attritor, a (very) high-pressure homogeniser, or a membrane emulsification device to make the emulsion, all of which are well known to the skilled person.

For example, in a method utilizing a capillary channel, a mixed solution of the liquid of the first portion and the liquid of the second portion are sent through a capillary channel having a pinchcock. The method utilising a capillary channel produces the emulsion continuously. In the capillary channel method, the mixture of the liquids is produced by being sent through the capillary channel. The capillary channel has a constriction generating a large pressure gradient applying sufficient shear force to a mixture of the liquids passing therethrough. The width of the constriction is for example less than 10 micrometer in order to apply sufficient shear force for dispersing the first portion in the second portion. The lower limit of the width of the pinchcock portion is not critical and is may be about 2 micrometer. The diameter of the channel outside the constriction is for example less than 0.5 mm. If the diameter of the channel is larger than 0.5 mm, fluid may accumulate at the upstream from the constriction, causing the first portion not to disperse sufficiently. The mixture of liquids is forced through the constriction with a pressure of at least 1 MPa to generate sufficient shearing force on the mixture for dispersing the first portion. The pressure is for example larger than 10 MPa; the pressure is for example lower than 1,000 MPa. The constriction for example has a mechanism for automatically adjusting the width of the channel between 0 micrometer and 10 micrometer according to the pressure, as is known in the art.

The dispersed first portion has for example a droplet size between 0.05 micrometer and 10 micrometer and, for example a CV (Coefficient of Variation) value of 10% or less. In some examples, when the droplet size is larger than 0.05 micrometer, the adsorption on the surface of the support plate is improved. In some examples, when the droplet size is smaller than 10 micrometer, the uniformity of adsorption on the surface of the support plate is improved. In examples the lower limit is 1 micrometer and/or the upper limit is 5 micrometer.

The CV value is defined as $(\sigma/D_n) \times 100$, where $\sigma$ is the standard deviation of the droplet size and $D_n$ is the average droplet size. A low CV value for example improves the uniformity of the coalescence on the surface of the support plate. The standard deviation and the droplet size may be measured with a microscope, e.g. by measuring 100 droplets or by dynamic light scattering with e.g. the ZETASIZER Nano Series Nano-ZS of Malvern Instruments Ltd.

In some examples, the emulsion may have a low stability and hence droplets of the first portion or the second portion may rapidly coalesce with each other. In such cases, the emulsion may be prepared immediately before dispensing the first liquid (as an emulsion). This can be achieved by arranging the device for making the emulsion as a unit in the device for dispensing the first liquid, thereby reducing the time between making the emulsion and dispensing it. Alternatively, the emulsion can be stabilised before it is dispensed on the support plate by adding an additive such as a surfactant to the emulsion that improves the stability of the droplets of the first or second portions. This additive may have no effect on the performance of the electrowetting device in the short or long term. However, as will be appreciated by the skilled person, such an additive is not a requirement for performing the method according to examples. Indeed, in examples, performing the method without additives increases the lifetime of the manufactured electrowetting device compared with a known method in which additives are used.

Further details of an emulsion for use in examples of the method described herein are given by way of reference to PCT patent application no. PCT/EP2011/056776.

In some examples, the first portion, which transfers to the second liquid, is a dispersed phase of the emulsion and the second portion is a continuous phase of the emulsion. In other examples, the first portion is the continuous phase and the second portion is the dispersed phase. A dispersed phase of an emulsion for example is formed of discrete volumes of a liquid which are separated by a continuous volume of a different liquid.

The first portion in some examples may be substantially the same as the second liquid as described above, for example with the same chemical composition. Examples of the second portion are also described above.

It is to be noted that the second portion is the remaining portion of the first liquid dispensed on the surface of the support plate after the first portion has transferred into the second liquid. Each or either of the first portion and the second portion in some examples therefore may comprise a mixture of different chemical compounds which might include solid particles, for example a pigment, suspended in a liquid; in other examples each or either of the first and second portions may predominantly or solely comprise a single chemical compound.

The above examples are to be understood as illustrative examples. Further examples are envisaged.

The examples above describe dispensing the first liquid so it is supported by the support plate. However, in some examples of the method, there may be one or more intermediate elements between the first liquid and the support plate. Hence, the term "on a surface of a support plate" as used herein in examples envisages both possibilities: a first liquid dispensed on a surface of a support plate may be dispensed so it is either adjoining the surface of the support plate or so it is supported by the support plate but not in contact with, touching or adjoining the support plate.

In some examples, the second liquid is dispensed on the surface of the support plate instead of on an upper surface of the first liquid. For example, one or both of the first liquid and the second liquid may be dispensed on the surface of the same support plate. In such examples, the first liquid may be dispensed on the surface of the support plate either before or after the second liquid is dispensed. For example, the second liquid may be placed in a bath and the support plate placed within the bath such that the second liquid is dispensed on the surface of the support plate and then the first liquid may be dispensed. In examples with the second liquid dispensed on the surface of the support plate, the first liquid may be dispensed beneath the second liquid, thereby at least partly displacing the second liquid so that the first liquid at least partly adjoins the surface of the support plate. For example, the second liquid may be dispensed on the support plate first and then the first liquid may be dispensed beneath the second liquid using a suitably configured dispenser. The dispenser may be a nozzle arranged in the second liquid, for example, which deposits the first liquid through the second liquid and onto the support plate so that the first liquid is dispensed beneath the second liquid.

In some examples, such as the above-described example of FIG. 4, the second support plate is arranged on the second layer after the second layer has been formed. However, in other examples, the second support plate may be arranged on a surface of the second liquid, with the second liquid being positioned between the second support plate and the second portion, so that the second liquid lies between the second support plate and the second portion. In these examples, the second liquid is dispensed with a thickness for substantially blocking the second portion from contacting a surface of the second support plate. The term "substantially blocking" referred to herein in examples refers to the second liquid having a thickness such that less than 10% or 5% of the volume of the second portion comes into contact with the second support plate, or so that the extent of the second portion contacting the surface of the second support plate is sufficiently small so as not to adversely affect the display quality of the electrowetting device. The second liquid may therefore act as a barrier between the second portion and the second support plate, preventing or restricting contact with the second support plate. This prevents adherence of the second portion to the second support plate, which can occur if the second portion and the second support plate come into contact. Adherence of the second portion to the second support plate can reduce the display quality, for example if the second portion is coloured and blocks light from passing through a portion of the display element due to its position on the second support plate. Therefore, with the second liquid acting as a barrier and substantially blocking or restricting the second portion from adjoining the second support plate, the display quality may be improved compared with an electrowetting device manufactured without providing such a barrier layer.

In some examples, the electrowetting device may be rotated or turned upside down after dispensing the first liquid and the second liquid, and in some examples after sealing, to aid the transfer of the first portion to the second liquid.

In examples, the method may be used to manufacture an electrowetting display device with a first layer of liquid on a surface of a first support plate, a different layer of the same liquid adjoining a surface of a second support plate, and a second layer of liquid between the two layers of the same liquid. In the manufactured device a configuration of each of the first layer of liquid and the different layer of the same liquid may be independently controlled to change the display effect provided by the display element. The method of manufacture of such a device may be similar to that described above. For example, the manufacturing method may include independently dispensing the first liquid on the surface of the first support plate and dispensing the first liquid on the surface of the second support plate, followed by dispensing the second liquid to adjoin the first liquid on the first support plate and the first liquid on the second support plate such that a first portion of the first liquid on the first support plate and a first portion of the first liquid on the second support plate transfers into the second liquid. In an example, such a device may be manufactured using a roll-to-roll method as will be known to the skilled person. A suitable roll-to-roll method may include dispensing the first liquid on the first support plate and on the second support plate and then bringing the first and second support plates together, using rollers, and moving the first and second support plates through a volume of the second liquid, again using rollers, thereby dispensing the second liquid between the first liquid on the first support plate and the first liquid on the second support plate so as to be adjoined with the first liquids on the first and second support plates. A first portion of the first liquid on the first support plate and a first portion of the first liquid on the second support plate then transfers into the second liquid, thus forming the two layers of the same liquid and the second layer of liquid of the manufactured device, as the skilled person will appreciate.

Figure 5:
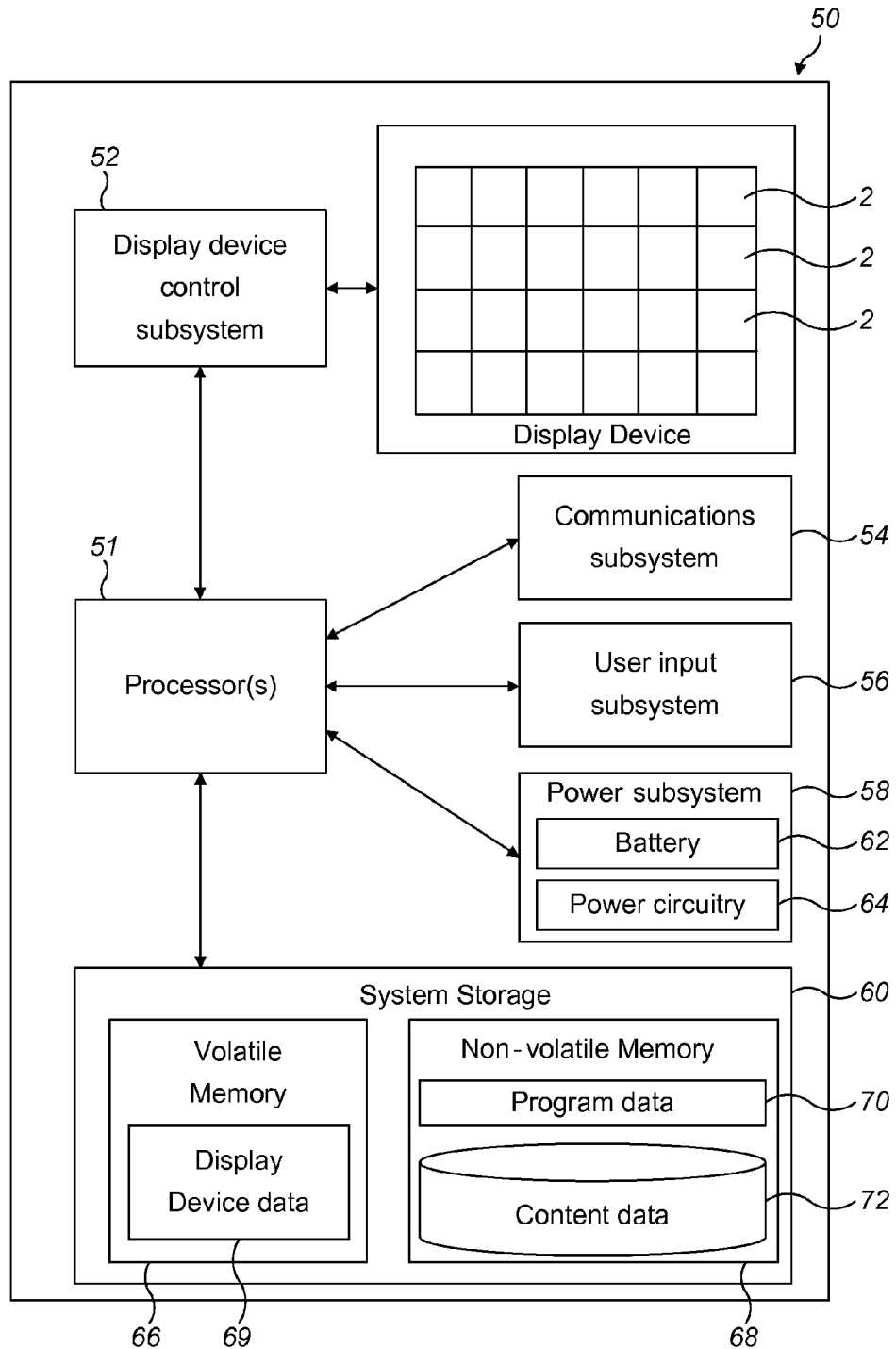
FIG. 5 shows a schematic system diagram of an example apparatus including an electrowetting display device.

FIG. 5 shows schematically a system diagram of an example system, for example apparatus 50, comprising an electrowetting display device such as the electrowetting display device 1 described above comprising electrowetting display elements 2. The apparatus is for example a portable, i.e. mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 50. The apparatus includes at least one processor 51 connected to and therefore in data communication with for example: a display device control subsystem 52, a communications subsystem 54, a user input subsystem 56, a power subsystem 58 and system storage 60. The display device control subsystem is connected to and is therefore in data communication with the display device 1. The at least one processor 51 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 60. The at least one processor may additionally, or in the alternative, contain memory, such as processor registers.

The display device control subsystem 52 for example includes electrowetting display element driver components, for use in applying a voltage to any of the electrowetting display elements, to address different such display elements. In examples the electrowetting display elements are configured according to an active matrix configuration and the display device control subsystem is configured to control switching elements such as thin film transistors (TFTs) of the display device 1 via circuitry to control the electrowetting display elements. The circuitry may include signal and control lines such as those described above.

The communications subsystem 54 for example is configured for the apparatus to communicate with for example a computing device via a data network, for example a computer network such as the Internet, a local area network, a wide area network, a telecommunications network, a wired network, a wireless network, or some other type of network. The communications subsystem 54 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 56 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 58 for example includes power circuitry 64 for use in transferring and controlling power consumed by the apparatus. The power may be provided by a mains electricity supply or from a battery 62, via the power circuitry. The power circuitry may further be used for charging the battery from a mains electricity supply.

The system storage 60 includes at least one memory, for example at least one of volatile memory 66 and non-volatile memory 68 and may comprise a non-transistory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, i.e. computer program instructions. Therefore, the at least one memory and the computer program instructions may be configured to, with the at least one processor, control a display effect provided by the electrowetting display device.

In the example of FIG. 5, the volatile memory 66 stores for example display device data 69 which is indicative of display effects to be provided by the display device 1. The processor 51 may transmit data, based on the display device data, to the display device control subsystem 52 which in turn outputs signals to the display device for applying voltages to the display elements, for providing display effects from the display device. The non-volatile memory 68 stores for example program data 70 and/or content data 72. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of manufacturing an electrowetting device, the method comprising:
   dispensing a first liquid on a surface of a support plate for the electrowetting device, the first liquid being emulsion;
   dispensing a second liquid to adjoin the first liquid; and
   a first portion of the first liquid transferring into the second liquid, thereby forming:
   a first layer of liquid comprising a second portion of the first liquid and
   a second layer of liquid comprising the second liquid and the first portion of the first liquid, the second layer substantially immiscible with the first layer.

2. The method according to claim 1, wherein the dispensing the second liquid comprises dispensing the second liquid on an upper surface of the first liquid.

3. The method according to claim 1, wherein the dispensing the second liquid comprises dispensing the second liquid on the surface of the support plate before the dispensing the first liquid,
the dispensing the first liquid comprising dispensing the first liquid on the surface of the support plate beneath the second liquid, thereby at least partly displacing the second liquid so that the first liquid at least partly adjoins the surface of the support plate.

4. The method according to claim 1, wherein the surface of the support plate is hydrophobic.

5. The method according to claim 1, wherein the dispensing the second liquid to adjoin the first liquid initiates the first portion of the first liquid transferring into the second liquid.

6. The method according to claim 1, comprising at least one of: heating, sonicating, agitating, stirring or vibrating, to at least one of initiate or assist the first portion of the first liquid transferring into the second liquid.

7. The method according to claim 1, wherein the surface of the support plate has a lower wettability for the first portion than for the second portion.

8. The method according to claim 1, comprising mixing the first portion and the second portion together to form the emulsion before dispensing the second liquid.

9. The method according to claim 1, comprising the first portion mixing with the second liquid after the first portion of the first liquid transferring into the second liquid.

10. The method according to claim 1, wherein the first portion is at least one of electrically conductive or polar.

11. The method according to claim 1, wherein the first portion has a pre-determined volume such that, after the first portion of the first liquid transferring into the second liquid, the second layer has a pre-determined volume for a manufactured electrowetting device.

12. The method according to claim 1, wherein the support plate has at least one wall for confining the first layer to adjoin a part of the surface, the at least one wall having a height, the dispensing the first liquid comprising dispensing a volume of the first liquid with a thickness substantially equal to the height of the at least one wall.

13. The method according to claim 1, including applying a second support plate on a surface of the second liquid, the second liquid positioned between the second support plate and the second portion, and the dispensing the second liquid to adjoin the first liquid comprising dispensing the second liquid with a thickness for substantially blocking the second portion from contacting a surface of the second support plate.

14. The method according to claim 1, wherein the second portion comprises at least one of: an alkane, decane, hexadecane, a silicone oil, hexamethyldisiloxane, or decalin.

15. The method according to claim 1, wherein the second liquid comprises at least one of: water; a polyether; a peroxide; a polyol; a diol; a triol; a tetraol; an ether; dioxalane; dimethoxymethane; an amide; a polyamide; a carboxylic acid; formic acid; acetic acid; propanoic acid; glycolic acid; a heteroatom substituted carboxylic acid; a halogenated carboxylic acid; chloroacetic acid; trifluoroacetic acid; a dicarboxylic acid; oxalic acid; malonic acid; succinic acid; glutaric acid; a tricarboxylic acid; citric acid; aconitic acid; an ester; methyl acetate; ethyl lactate; a sulphone; dimethyl sulphate; dimethyl sulphite; methylsulphonylmethane; an aldehyde; acetaldehyde; glyoxal; methylglyoxal; a peroxide; methyl ethyl ketone peroxide; oxamic acid; organosulphoxide; ethylene carbonate; propylene carbonate; diethylene glycol; ethylene glycol; polyethylene glycol; propylene glycol; erythritol; glycerol; butanetriol; derivatives thereof; or any combinations thereof.

16. The method according to claim 1, wherein a respective one of the first portion or the second portion is a dispersed phase of the emulsion and a respective other of the first portion or the second portion is a continuous phase of the emulsion.

17. The method according to claim 1, wherein the dispensing the first liquid and the dispensing the second liquid are each performed using independently one of a one-drop-fill method or a slit-filling method.

18. The method according to claim 1, comprising:
applying a second support plate on the second layer; and
sealing the second support plate to the first support plate with a sealing element, thereby enclosing the first layer and the second layer within a sealed chamber for the electrowetting device.

* * * * *

UNITED STATES PATENT AND TRADEMARK OFFICE
CERTIFICATE OF CORRECTION

| | | |
|---|---|---|
| PATENT NO. | : 9,625,704 B1 | Page 1 of 1 |
| APPLICATION NO. | : 14/577692 | |
| DATED | : April 18, 2017 | |
| INVENTOR(S) | : Slack et al. | |

It is certified that error appears in the above-identified patent and that said Letters Patent is hereby corrected as shown below:

In the Claims

In Column 22, Line 55, in Claim 1, delete "being" and insert -- being an --, therefor.

In Column 22, Line 61, in Claim 1, delete "liquid and" and insert -- liquid; and --, therefor.

In Column 24, Line 35, in Claim 17, delete "of a" and insert -- of: a --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*